Sept. 2, 1947.  J. ROGOFF  2,426,845
CABLE END SEALING DEVICE
Filed Nov. 17, 1944

INVENTOR
Julian Rogoff
BY
ATTORNEY

Patented Sept. 2, 1947

2,426,845

UNITED STATES PATENT OFFICE 2,426,845

CABLE END SEALING DEVICE

Julian Rogoff, New Rochelle, N. Y., assignor to Burndy Engineering Company, Inc., a corporation of New York Application November 17, 1944, Serial No. 563,962

2 Claims. (Cl. 173—269)

1

My invention relates to means for sealing the exposed end of a cable to its insulation to make it watertight.

In naval and merchant vessels, which are compartmentalized into waterproof sections, the electric cables which pass from one compartment to another may act as hoses to carry water from a flooded compartment to a dry one. To prevent this it is necessary to seal the ends of the cables at the point where the cables are connected to electrical equipment or apparatus.

The principal object of my invention therefore is to provide a method of sealing a cable end which permits the cable's end to be attached to electrical equipment or other terminal connection without loss of the watertight seal between the cable and its insulation.

Other objects are to provide a device of the foregoing character which does not increase the effective cable diameter to any substantial degree, which device is easily compressed into contact with the exposed cable end, but which is not easily deformed when compressed to the cable insulation; to provide a device the walls of which are relatively thinner in that portion which fits over the exposed end of the cable compared to the walls of the portion which fits over the insulation; and to provide a cable and sealing device which can be circumferentially compressed around the insulation of a cable to insure a good water-tight connection, without extruding the insulation thereform.

I accomplish these and other objects and obtain my new results as will be apparent from the device described in the following specification, particularly pointed out in the claims, and illustrated in the accompanying drawing in which:

Figure 1:
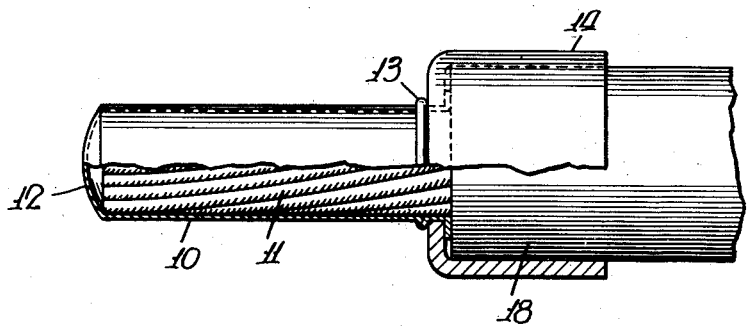
Fig. 1 is a side view partially in section of my cable-end seal inserted over an insulated cable.

Referring more in detail to the drawing, reference numeral 10 designates the thimble portion of my device which has a length substantially equal to the exposed conductor 11.

The thimble 10 has an enclosing end section 12 which gives the thimble a cup-shape.

Figure 2:
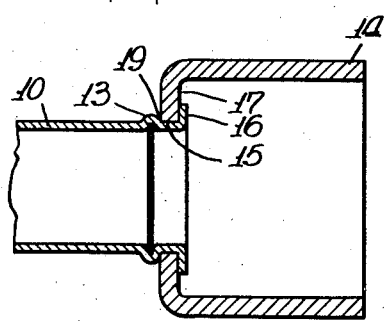
Fig. 2 is an enlarged view of the junction between the conducting thimble of the device and the insulation gripping shroud.

As shown in Fig. 2, the thimble 11 is provided with a circumferential bead 13 which acts as a stop when the shroud 14 is inserted thereover, the

2 aperture 15 having a diameter to permit such insertion. Thereafter the end 16 of the thimble is spun over against the inside face 17 of the shroud, to secure the shroud and thimble together. The points of contact are brazed, as at 19, to insure a secure and water-tight joint.

The wall of the thimble is preferably about .010" thick so that it may be readily deformed into intimate electrical contact with the electrical conductor and 11, when clamped by any conventional type of connector or terminal. On the other hand the shroud of my device must have a relatively heavy wall, approximately .040" thick, to retain its shape after compression and to hold its shape under hydraulic pressures up to 500 pounds per square inch, as well as to resist mechanical stresses which might tend to break the seal between shroud and the insulation 18.

The insulation 18 may be the type usually found on marine cable or it may be a tubing slipped over the conductor 11.

In compressing the shroud 14 about the insulation 18, a conventional circumferential crimp has a tendency to extrude the insulation longitudinally out of the shroud. This movement is such that it pulls the electrical conductor at least partially out of the thimble 10. It is therefore necessary to compress the shroud about the insulation in a manner that will not force the conductor end out of the thimble but will preferably force it therein.

Figure 3:
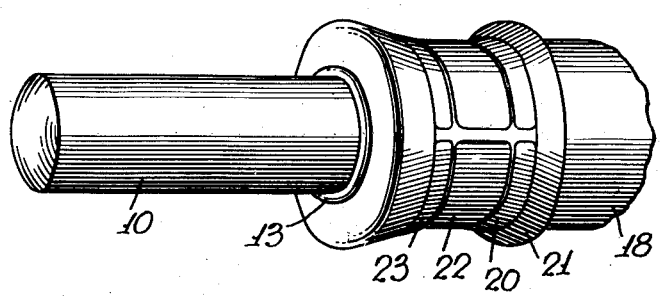
Fig. 3 is a perspective view of the device provided with a preferred indentation used to prevent the insulation from being extruded from the device during the sealing operation.

I have discovered that this may be accomplished by a narrow circumferential indentation close to the open end of the shroud 14, which indentation actually forces the insulation 18 back into the shroud and thereby moves the conductor end 11, into the thimble 10. This type of connection is shown in Fig. 3, and may be accomplished by a crimping tool as enclosed in the concurrently filed application to Dupre, Serial Number 563,029.

The connection results in a narrow circumferential indentation 20, immediately adjacent the end 21 of the shroud 14. Indentation 22, and 23 may also be added to increase the pull-out values of the connection. The device may also be used for oil filled cables wherein the end connection must at all times be sealed to prevent oil leakage.

I have in the foregoing accomplished the objects of my invention by providing a device with an easily collapsible wall for intimate contact with the electrical conductor contained therein, in combination with a shroud that is sufficiently thicker than the conductor contacting walls to permit insertion over the insulation of a cable and be compressed thereto by a suitable tool, forming a seal for the cable that will resist the stresses and pressures usually encountered in marine installations.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. A closed end cable terminal comprising a shroud and closed end attached thimble for use with a cable clamp and an insulated cable having a length of insulation removed from the end thereof, said cable thimble being of a readily deformable conducting material having a wall thickness of the order of .010 inch and a length substantially equal to the length of insulation removed from said cable end for snugly fitting said cable end; said shroud for securement to the open end of said sleeve and having a wall thickness substantially greater than that of said thimble and having a circumferential indentation when applied to said cable end adjacent the open end of the shroud, thereby forming a seal between said shroud and the insulation of the cable.

2. The terminal of claim 1 wherein the shroud and thimble comprise two separate pieces, said thimble being provided with a circumferential beading for supporting the shroud in position, the open end of the thimble being flattened over the inside wall of the shroud for securing the shroud and thimble together.

JULIAN ROGOFF.

REFERENCES CITED

The following references are of record in the file of this patent:

UNITED STATES PATENTS

| Number | Name | Date |
|---|---|---|
| 2,012,689 | McFarlin | Aug. 27, 1935 |
| 1,641,923 | Davis | Sept. 6, 1927 |
| 2,320,155 | Papp | May 25, 1943 |
| 2,385,792 | Carlson | Oct. 2, 1945 |
| 2,044,974 | Douglas | June 23, 1936 |

FOREIGN PATENTS

| Number | Country | Date |
|---|---|---|
| 212,921 | Switzerland | Apr. 1, 1941 |